April 21, 1931. J. F. BOWERS 1,801,716
TIRE INFLATION DEVICE
Filed Nov. 9, 1928 2 Sheets-Sheet 1
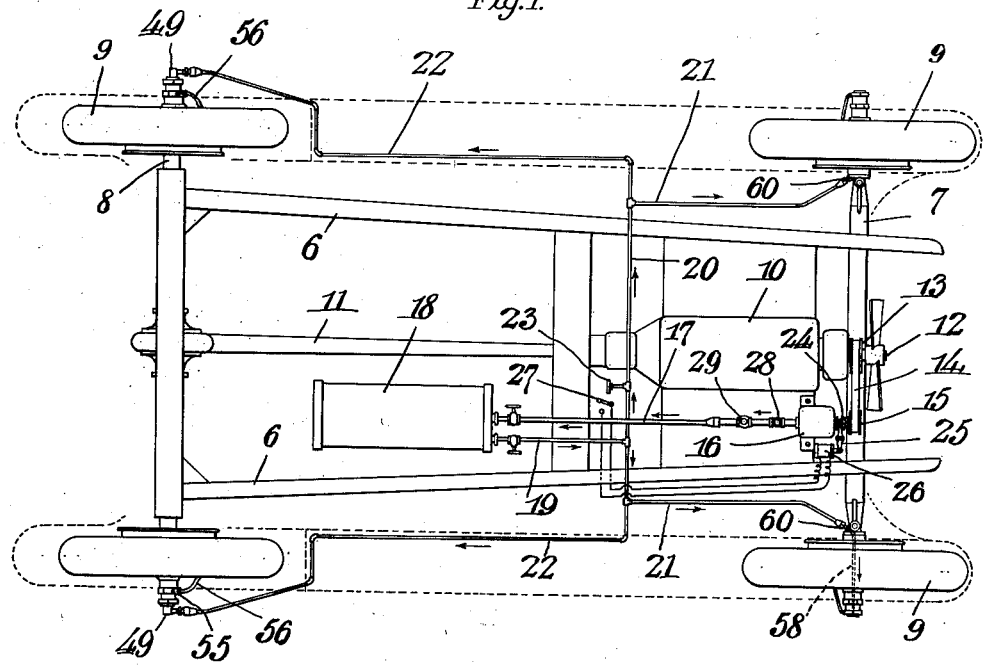
Inventor
John F. Bowers
By Dwight B. Gain
Attorney

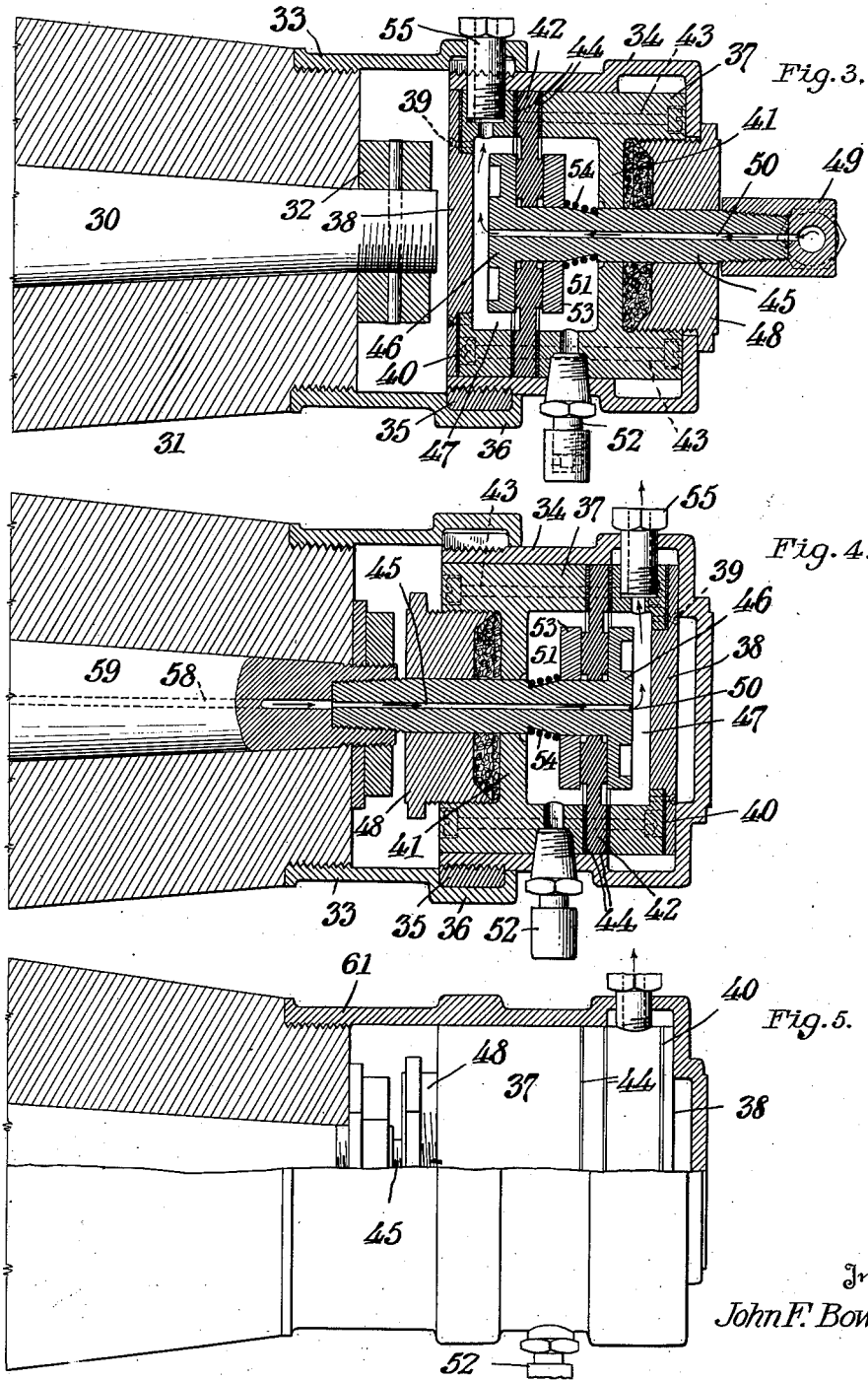

Patented Apr. 21, 1931

1,801,716

UNITED STATES PATENT OFFICE

JOHN F. BOWERS, OF GEORGETOWN, DELAWARE

TIRE-INFLATION DEVICE

Application filed November 9, 1928. Serial No. 318,269.

This invention relates to tire inflation devices, having particular reference to permanent mechanism associated with the motor vehicle for keeping the tires properly inflated at all times.

The primary object of the invention is to provide a tire inflation mechanism forming a permanent part of the motor vehicle structure which is capable of establishing and maintaining a predetermined pressure of air in the tires at all times whether or not the vehicle is moving.

A further object of the invention is to provide means of an automatic nature associated with a tire inflation mechanism whereby the mechanism will be rendered inoperative immediately the prescribed air pressure in the tires has been reached.

A further object of the invention is to provide tire inflation mechanism of the character generally stated which may be energized by the motor or driving mechanism for the motor vehicle or from a source of power separate therefrom and installed upon the machine, or in the event the vehicle is equipped with air brakes, the inflation mechanism may be associated with the air pumping mechanism for such brakes or connected directly with the compression tank for such a system.

A still further object of the invention is to provide improved means for connecting the air leads of the pressure mechanism to the wheels and for delivering the air therefrom to the tires; such means being so constructed as to overcome the tendency to wear or become inoperative and also to preclude possibility of becoming heated and at the same time insure proper operation and free distribution of the air at all times.

A still further object is to provide permanent tire inflation mechanism associated with the wheels of the motor vehicle of such character and construction as not to seriously interfere with or impede the operations of applying or removing tires.

A still further object is to provide tire inflation mechanism of such character and construction as to be readily applicable to motor vehicles already in use, or which may be assembled with the vehicle in the course of construction thereof so as to form a part of its standard equipment.

Still further objects reside in the construction of hub mechanism for the wheels which shall be of such character as to preclude leakage of air as well as lubricant; which involves the use of comparatively few parts; such parts being of such construction as will permit of the hub structure being manufactured easily and at little cost, and wherein the parts may be readily assembled without the exercise of special skill or knowledge; the several parts being so assembled as to preclude working loose of the same after continuous usage; and wherein the various objects above set forth are fully accomplished.

With these objects in view, together with others which will appear as the description proceeds, the invention consists in the novel construction, combination and arrangement of parts, all as will be described more fully hereinafter, illustrated in the drawings, and particularly pointed out in the claims.

In the drawings:

Fig. 1 is a plan view of a conventional form of motor vehicle chassis having associated therewith a tire inflation mechanism embodying the invention, Fig. 2 is a side elevation of the vehicle, Fig. 3 is a sectional view taken upon an enlarged scale through the end of a rear wheel hub of the vehicle and illustrating my improved air distributing hub mechanism associated therewith, Fig. 4 is a similar view of a front wheel hub and mechanism, and Fig. 5 is a fragmentary sectional view through a front vehicle hub and illustrating a slight modification of the hub housing.

Referring now more particularly to the drawings, the longitudinal sills of the vehicle chassis are indicated at 6, and the front and rear axles 7 and 8 are associated therewith in the usual manner; these axles being supported by wheels 9 having the usual pneumatic tires as will be understood. The motor of the vehicle is indicated at 10, and is supported by the sills in any approved manner. This motor drives the rear wheels 9 through the instrumentality of a drive rod 11 or any other preferred means. The motor shaft projects forwardly as at 12, and is provided with a pulley 13 over which passes a belt 14 to drive a pulley 15 associated with a compressor 16. This compressor may be of any approved type or form and is mounted upon or adjacent to the motor housing and preferably beneath the hood of the vehicle in such position as to be readily accessible. The compressor 16, when in operation, forces air through a pipe 17 to a storage tank 18 mounted in any convenient place upon the vehicle. This storage tank has a delivery pipe 19 connected thereto which communicates with a cross pipe 20 preferably disposed adjacent to the motor 10. The cross pipe 20 at its ends has branches 21 and 22 leading respectively to the front and rear wheels 9 of the vehicle. The cross pipe 20 has associated therewith a pressure gauge 23 located preferably upon the dash of the vehicle or any other place where it may be readily viewed by the operator of the vehicle.

Associated with the pulley 15 is a clutch 24 operated by an arm 25 located adjacent thereto and capable of rocking back and forth. This arm has its outer end associated with an electromagnet 26 which is energized or de-energized by operation of the switch 27 also located upon the dash or within convenient reach by the operator. The pipe line 17 is provided with a check valve 28 and also a relief valve 29; the former preventing back pressure upon the compressor and the latter opening to atmosphere when a predetermined pressure in the system has been reached.

It will be understood that the compressor and clutch mechanism as well as the means for controlling the clutch may be of any desired type. It will also be understood that the check and blow-off valves may be of any desired type, and the details of the structure of these particular parts of the system are omitted for that reason.

The means for delivering air under pressure to the wheels of the vehicle and for ultimate delivery to the pneumatic tires thereof will now be described, and while the parts for the front and rear wheel mechanisms are identical in construction, their assemblage varies slightly due to variations in the structure of the air leads.

In Fig. 3 there is illustrated a part of a rear wheel spindle indicated at 30, the hub of the wheel being represented at 31 mounted upon the spindle, being held thereon by the nut 32. A shell 33 is secured to the hub 31 and projects outwardly therefrom and carries a housing 34. This housing is of annular formation similar to the shell 33, and is tightly fitted in the same. To facilitate this connection, an internally threaded split ring 35 is engaged in the annular groove 36 of the shell, and the inner externally threaded end of the housing 34 engages the threads of said ring and expands the latter into said groove. This construction simplifies the connection between these parts and yet assembles the same substantially as a unit.

The housing 34 has arranged therein a two-part sleeve 37 extending approximately the entire length of the housing and provided at its inner end with a removable head 38. This head may be secured to the sleeve by means of screws 39, and a gasket 40 is interposed between the head and the sleeve to insure an air tight joint.

The sleeve 37 is provided inwardly from its outer end with a head 41 preferably formed integral with the sleeve, and a wall 42 is arranged between the two parts of the sleeve approximately midway between the two heads. This wall may constitute a disc or diaphragm readily insertable in the sleeve and held in place therein by the bolts 43 passing longitudinally through the sleeve walls in the manner shown. Packing gaskets 44 are interposed between the opposite faces of the wall 42 and the sleeve sections so that when the bolts 43 are tightened an air tight connection will be made between the wall and said sleeve sections.

Associated with the sleeve 37 is an air spindle 45. This spindle extends axially through the sleeve and is provided at its inner end with an enlargement or head 46 disposed within the air chamber 47 between the wall 42 and removable head 38. The air spindle passes through an aperture disposed centrally of the wall 42 and the fixed head 41 and terminates at its outer end beyond the outer extremity of the housing. A packing nut 48 surrounds this air spindle, permitting relative rotation of one parts yet establishes an air tight connection. The outer extremity of the air spindle is externally threaded as shown to receive a coupling 49 to receive an air supply. The air spindle is provided with a longitudinal bore 50 through which air passes from the coupling to the air chamber 47.

The space within the sleeve between the wall 42 and the fixed head 41 constitutes a lubricant chamber 51 which may be supplied with lubricant through a fitting indicated at 52. In order to insure a tight fit between the spindle 45 and the wall 42, notwithstanding that these parts have relative movement, a washer 53 encircles the spindle within the chamber 51, and is held tightly engaged with the adjacent face of the wall 42 by the spring 54. This spring encircles the spindle and has one end engaged with the washer 53 while its opposite end is seated in a recess as shown formed in the spindle.

In the present instance, the air spindle 45 remains stationary while all the remaining parts rotate as a unit about the same, and to preclude wear of the tightly fitting parts above referred to, the spindle and its head as well as the washer 53 may be made of hard metal, while the wall 42 may be made of brass or some other comparatively soft metal.

Extending through the annular groove 36, split ring 35 and the inner end of the sleeve 37 is a hose or pipe coupling 55, which coupling communicates with the air chamber 47, of the sleeve. Associated with this coupling is a pipe or tube 56 leading to the inflation stem 57 of the tire, so that air within said chamber 47 may pass through to the interior of the tire. The coupling 49 is attached to the rear end of pipe 22 of the air distributing system.

From the foregoing it is apparent that compressed air flows from the storage tank 18 through the pipe 19 to pipe 20 and through pipes 22 to the spindle couplings 49 from whence it passes through the bore or port 50 into the chamber 47. From this chamber the air passes through pipe 56 and inflation stem 57 to the tire.

The front wheel construction is illustrated in Fig. 4, and in this figure the air passes through a port or bore 58 in the front wheel spindle 59. The forwardly extending air pipes 21 are equipped with couplings 60 which establish communication between the air distributing system and the bore 58 of the front wheel spindle. The structure of the hub mechanism of the front wheel is precisely the same as the rear wheel with the single exception that the air spindle 45 is reversed. In this case, the outer threaded end of the air spindle engages internal threads in the end of the front wheel spindle 59 and remains stationary therewith. The remaining parts, as in the case of the rear wheel, rotate about the fixed air spindle, and the distribution of air will be precisely the same, a pipe 56 establishing communication between the air chamber of the hub member and the inflation stem 57 of the wheel.

In Fig. 5 of the drawings there is illustrated a slight modification and wherein a single hub cap 61 is used. In such instances, the cap is applied to the wheel hub by the usual threaded connection, and forms a single structure to house the mechanism associated with the hub for distribution of air. While the hub cap in Fig. 5 is shown as associated with a front wheel structure it is apparent that it is susceptible of use upon the rear wheel by simply providing an aperture in the end of the cap through which the spindle 45 may project.

From the foregoing it is apparent that I have provided means of extremely simple nature for supplying wheels of the vehicle with air at proper pressure at all times, whether or not the vehicle is moving. When the compressor is energized, as by closing the switch 27, air under pressure is supplied to the tank 18 and distributed therefrom in equal degrees to all four wheels of the vehicle. The blow off valve 29 may be set to exhaust when a predetermined pressure has been reached in order that overinflation of the tires will be avoided. In instances where punctures occur, the injured tire may be kept to proper inflation notwithstanding the leakage, as air under sufficient pressure may be maintained in the storage tank to compensate for such losses. Should it occur that one or more of the tires become deflated while the vehicle is at a stand-still, idling of the motor with the compressor in action will cause sufficient air pressure to inflate the tires to the proper degree, and after the vehicle proceeds the compressor may be operated at proper times to supply any deficiency in pressure which may occur in any one or more of the tires. It is thus seen that the vehicle may proceed to operate notwithstanding that one or more of the tires may be punctured or contain leaks. The relatively movable parts within the supplementary hub may be kept properly lubricated by the application from time to time of a grease gun to the fitting 52, as will be readily understood. The connection between the air spindle and the wall 42 is such that escape of air from the air chamber into the lubricant chamber is prevented, while on the other hand it will be impossible for lubricant to enter the air chamber from the chamber 51.

While the above is a description of the invention in its preferred embodiments it is nevertheless to be understood that changes and variations in the details of construction and assemblage of parts, may be liberally resorted to if desired without departing from the spirit of the invention as defined by the claims.

Having thus described my invention, I claim:—

1. In a device of the class described, a wheel hub, a housing carried thereby, a sleeve within said housing, closures for the ends of said sleeve, a wall in said sleeve dividing the same into lubricant and air chambers, an air spindle axially alined with said hub and rotatably mounted in said sleeve, one end of said spindle extending into said air chamber, and an air take-off in communication with said air chamber.

2. In a device of the class described, a housing adapted to be secured to a wheel hub, a sleeve fixedly secured to said housing and within the latter, closures for the ends of said sleeve, a wall in said sleeve dividing the latter into lubricant and air chambers, an air spindle rotatably arranged within said sleeve and axially thereof, a head on the inner end of said spindle engaged with said wall, a plate surrounding said spindle and disposed within said lubricant chamber, a spring carried by said spindle and forcing said plate against said wall, the opposite end of said spindle projecting beyond said sleeve, the said spindle having an air passage extending axially therethrough, threads at the outer end of said spindle for engagement with an air pipe, and an air take-off in said housing communicating with said air chamber.

3. In a device of the class described, a hub cap having an annulus, a split internally threaded ring in said annulus, an exteriorly threaded housing to engage with the threads of said split ring, a wall within said housing providing an air chamber, an air spindle rotatable within said wall and communicating at one end with said chamber, means for the introduction of air to said chamber through said spindle, and an air take-off carried by said housing and in communication with said chamber.

In testimony whereof I hereby affix my signature.

JOHN F. BOWERS.